United States Patent [19]

Kronenberg

[11] Patent Number: 4,609,520
[45] Date of Patent: Sep. 2, 1986

[54] PROTECTION OF RADIATION DETECTORS FROM FAST NEUTRON DAMAGE

[75] Inventor: Stanley Kronenberg, Skillman, N.J.

[73] Assignee: The United States of America as represented by the Secretary of the Army, Washington, D.C.

[21] Appl. No.: 575,245

[22] Filed: Jan. 30, 1984

[51] Int. Cl.[4] .................. G21C 17/00; G01T 1/22
[52] U.S. Cl. .................... 376/153; 376/254; 376/255; 376/259; 250/370
[58] Field of Search ............. 376/153, 254, 255, 259, 376/914; 250/370, 370 F, 370 J, 390–392

[56] References Cited

U.S. PATENT DOCUMENTS

| | | | |
|---|---|---|---|
| 3,479,509 | 11/1969 | Grundy et al. | 250/370 F |
| 3,539,809 | 11/1970 | Lokerson | 250/370 F |
| 4,197,461 | 4/1980 | Umbarger et al. | 250/370 J X |
| 4,243,885 | 1/1981 | Agouridis et al. | 250/370 J X |
| 4,310,367 | 11/1981 | Hsu | 250/370 J X |

Primary Examiner—Salvatore Cangialosi
Attorney, Agent, or Firm—Anthony T. Lane; Jeremiah G. Murray; John T. Rehberg

[57] ABSTRACT

A circuit for biasing a solid state crystal used as a radiation detector in which the passage of the initial gamma ray pulse from the explosion of a nearby tactical nuclear weapon is utilized to temporarily remove the bias from said crystal for a time sufficient to permit the fast neutron pulse from the same explosion to pass by without permanently damaging the counter crystal. The circuit comprises an RC circuit between the bias supply and the crystal with a reverse biased diode across the capacitor.

4 Claims, 1 Drawing Figure

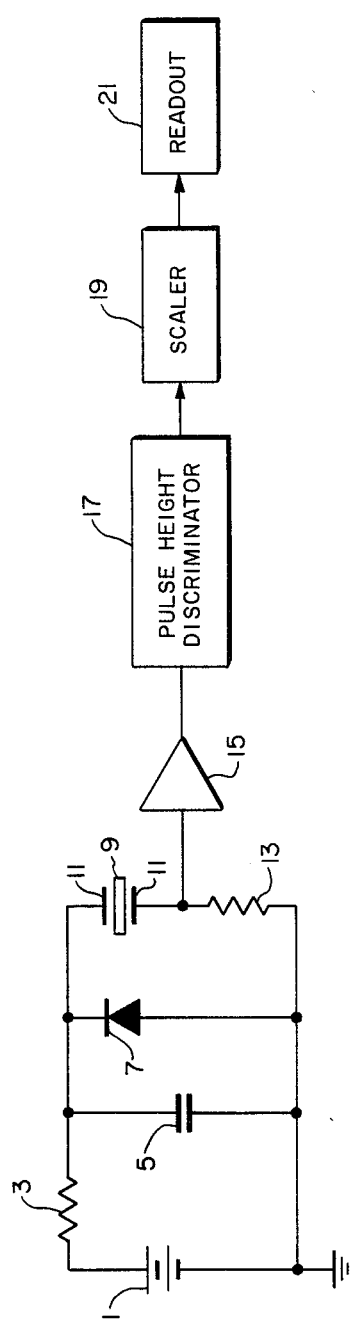

PROTECTION OF RADIATION DETECTORS FROM FAST NEUTRON DAMAGE

The invention described herein may be manufactured, used, and licensed by or for the Government for Governmental purposes without the payment to me of any royalties thereon.

BACKGROUND OF THE INVENTION

The invention relates to battlefield radiation detectors or dosimeters of the type which employ a biased solid state crystal, for example a cadmium telluride crystal as the radiation detector or crystal counter. Such detectors are useful in protecting personnel from overexposure to radiation from fallout following the explosion of tactical nuclear weapons. The prompt initial radiation (PIR) of these nuclear weapons comprises a short powerful gamma ray pulse and a fast neutron component, both emitted simultaneously during the explosion of the weapon. The gamma ray component travels at the speed characteristic of electromagnetic radiation, namely at the velocity of light (c) in a vacuum and only slightly slower in the atmosphere. The neutrons are produced with a range of initial velocities all of which are much smaller than c, and thus at points outside the radius of total destruction, the gamma ray pulse arrives first, followed by the high intensity fast neutron pulse which has been lengthened by the aforementioned velocity spread of its individual neutrons. The fast neutron pulse can damage a biased crystal radiation counter more severely than an unbiased one. In some cases a biased crystal can be destroyed by the fast neutrons of the PIR, however even an unbiased crystal will suffer loss of charge collection efficiency from these fast neutrons. The invention provides a circuit which responds to the passage of the high intensity gamma ray pulse to automatically remove the crystal counter bias for a short time sufficient to permit the fast neutron pulse to pass by in a less harmful manner, after which the crystal counter bias is restored and the crystal can resume its function of detecting radiation due to fallout.

SUMMARY OF THE INVENTION

The counter crystal is not biased directly from the dc bias supply but is connected thereto via a resistor-capacitor circuit with the resistor in series with the bias supply and the capacitor shunting the crystal counter. A reverse biased solid state diode is connected across the capacitor. The gamma ray pulse renders the diode temporarily conductive in the reverse direction, which discharges the capacitor voltage and thus removes the crystal counter bias until such time as the capacitor can be re-charged through the series resistor. The time constant is chosen sufficiently long to permit the passage of the aforementioned fast neutron pulse while the counter crystal is unbiased or at a very low bias. As soon as the capacitor is re-charged, the circuit is ready to perform its intended function.

It is thus an object of the invention to provide an improved battlefield radiation detector which is less affected by the fast neutron pulse resulting from the explosion of tactical nuclear weapons than are prior art detectors of this type.

Another object is to provide a biasing circuit for a solid state crystal radiation counter which will prevent damage thereto other than the loss of charge collection efficiency caused by fast neutrons resulting from the explosion of a tactical nuclear weapon.

A further object of the invention is to provide a radiation detector of the solid state type in which the passage of the initial gamma ray pulse from the explosion of a tactical nuclear weapon is utilized to temporarily remove the bias from the solid state crystal counter for a time sufficient to permit the fast neutron pulse from the same explosion to pass by without permanently damaging the said crystal counter, after which the bias is automatically restored.

These and other objects and advantages of the invention will become apparent from the following detailed description and the drawing.

BRIEF DESCRIPTION OF THE DRAWING

The sole FIGURE of the drawing is a circuit diagram of a radiation detector embodying the invention.

DETAILED DESCRIPTION OF A PREFERRED EMBODIMENT

The radius of total destruction of low power tactical nuclear weapons is small enough so that the aforementioned gamma and fast neutron pulses of the prompt initial radiation resulting from the explosion will be effective outside of the radius of total destruction. Furthermore, in tactical situations, many people both civilian and military may be located within several kilometers of the zone of total destruction and will be subjected to varying amounts of longer term effects of the blast such as fallout. The present invention provides a radiation detector which can measure such long term radiation effects and which will not be adversely affected by the aforementioned prompt initial radiation, even though the radiation detector is close to the zone of total destruction. Radiation detectors which use the aforementioned solid state crystal counters and which are located near the edge of the zone of total destruction require protection from the damaging effects of the fast neutron pulse, as explained above.

The drawing is a diagram of a radiation detector, a dose rate meter or a dosimeter which employs a solid state crystal counter 9 for detecting radiation. This crystal may for example comprise cadmium telluride and it is mounted between a pair of electrodes 11 which apply an electric field to the crystal from bias supply battery 1. Radiation passing through the crystal 9 will produce free electron/hole pairs within the crystal structure, and these free charges will be swept out of the crystal by the applied electric field to produce pulses in an external circuit, namely the resistor 13 connected in series with the biased crystal. The pulses appearing across resistor 13 are amplified and processed by the succeeding circuitry, namely amplifier 15, pulse height discriminator 17, scaler 19 and readout 21. All of this succeeding circuitry is conventional and the readout 21 can provide readings related to radiation dose rates or to total doses.

The novel biasing circuit comprises bias source 1 having its positive terminal connected through series resistor 3 to one electrode 11 of the crystal 9 and its other terminal grounded. The capacitor 5 and solid state diode 7 are shunted across the crystal and its series resistor 13. The diode has its cathode connected to the positive bias supply lead and it is thus reverse biased.

In normal operation the capacitor 5 will be rapidly charged through resistor 3 and the capacitor voltage will be applied to the crystal and resistor 13. Normally the reverse biased diode 7 will be non-conducting. When the high intensity initial gamma pulse of a nearby nuclear explosion arrives, it will, in passing through the crystal structure of diode 7, produce many high energy electrons as a result of the photoelectric and Compton effects. These high energy electrons in turn produce numerous electron/hole pairs which render the reverse biased diode 7 conductive in the reverse direction. This results in a rapid discharge of the capacitor 5 and removal of the bias from crystal counter 9. After the initial gamma ray passes, the diode 7 gradually recovers its normal function and the capacitor 5 gradually charges up through the resistor 3. The slower moving fast neutron pulse will arrive at the ranges of interest within a fraction of a second after the initial gamma pulse and will be gone within 1 second at the most. The time constant, RC, of the resistor 3 and capacitor 5 is chosen so that no substantial bias is applied to crystal counter 9 while the neutron pulse is passing. When the capacitor 5 has been fully re-charged the entire circuit is ready to monitor fallout type radiation. In practice a time constant of 1 second is sufficient to protect the counter crystal from the fast neutron pulse at any range at which this pulse could be harmful to the counter crystal.

While the invention has been described in connection with an illustrative embodiment, obvious variations therein will occur to those skilled in the art, accordingly the invention should be limited only by the scope of the appended claims.

I claim:

1. A device for measuring radiation emitted from a nuclear explosion, said radiation having a comparatively fast moving gamma ray component and a comparatively slower neutron component, said device comprising:
    a solid state crystal radiation detector;
    a voltage source applied to bias said detector; and
    means responsive to said gamma ray component for removing said bias voltage for a predetermined time period whereby said crystal radiation detector is rendered less sensitive to the passage of said neutron radiation component.

2. The device of claim 1 wherein said means comprises:
    a reverse-biased solid state diode connected in parallel with said solid state detector and with said voltage source;
    a capacitor connected in parallel with said diode;
    a resistor connected in series with said capacitor;
    said resistor and said capacitor together having a time constant which includes said predetermined time period.

3. The device of claim 2 wherein said time constant is approximately one second.

4. The device of claim 2 further comprising:
    an amplifier connected to said solid state detector; and
    a pulse height discriminator and a scaler connected to said amplifier.

* * * * *